H. M. LOFTON.
FIRE HYDRANT.
APPLICATION FILED AUG. 30, 1909.
978,385.
Patented Dec. 13, 1910.
2 SHEETS—SHEET 1.
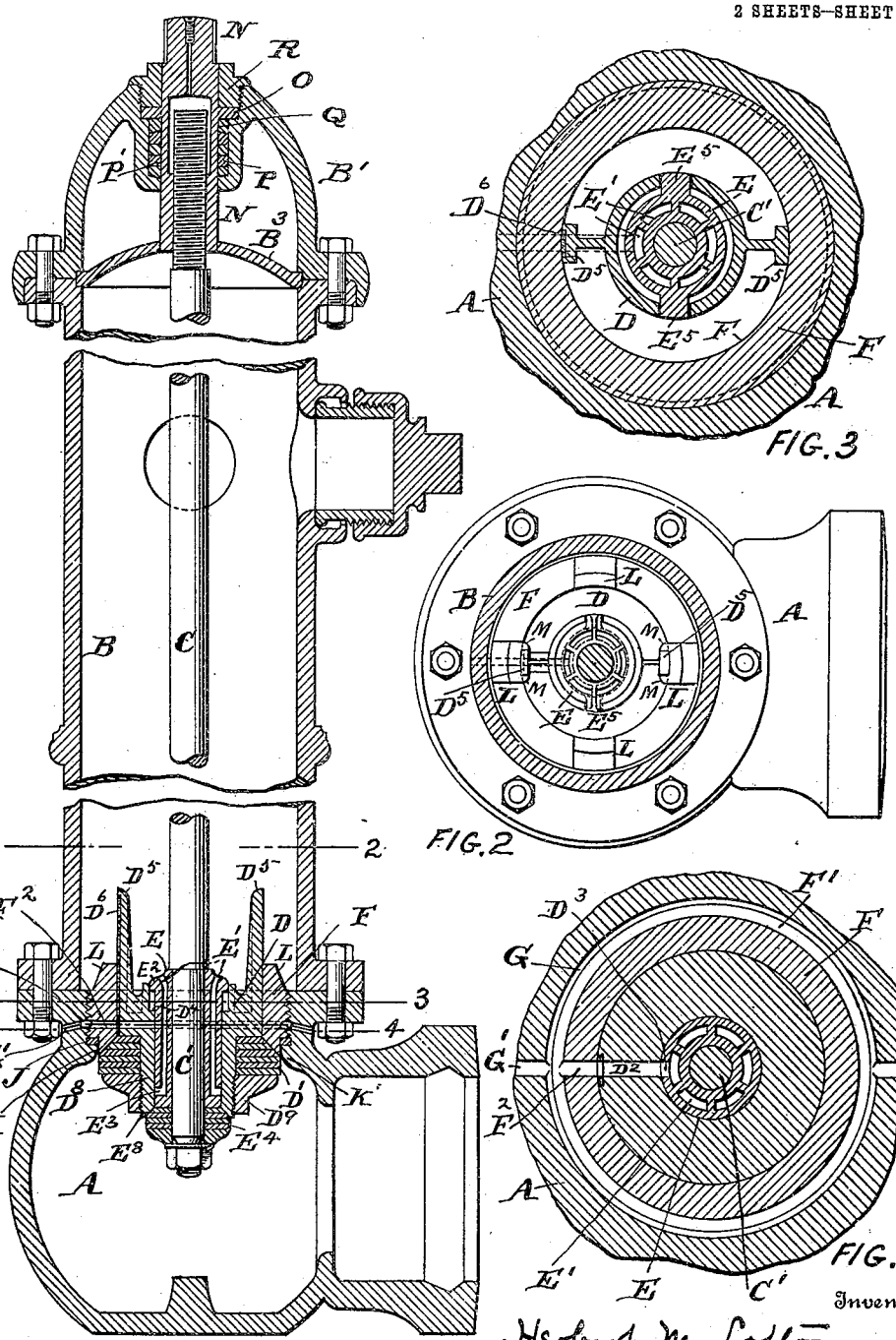
Witnesses
Daniel Webster, Jr.
E. H. Barlow.
Inventor
Herbert M. Lofton
By 
Attorney

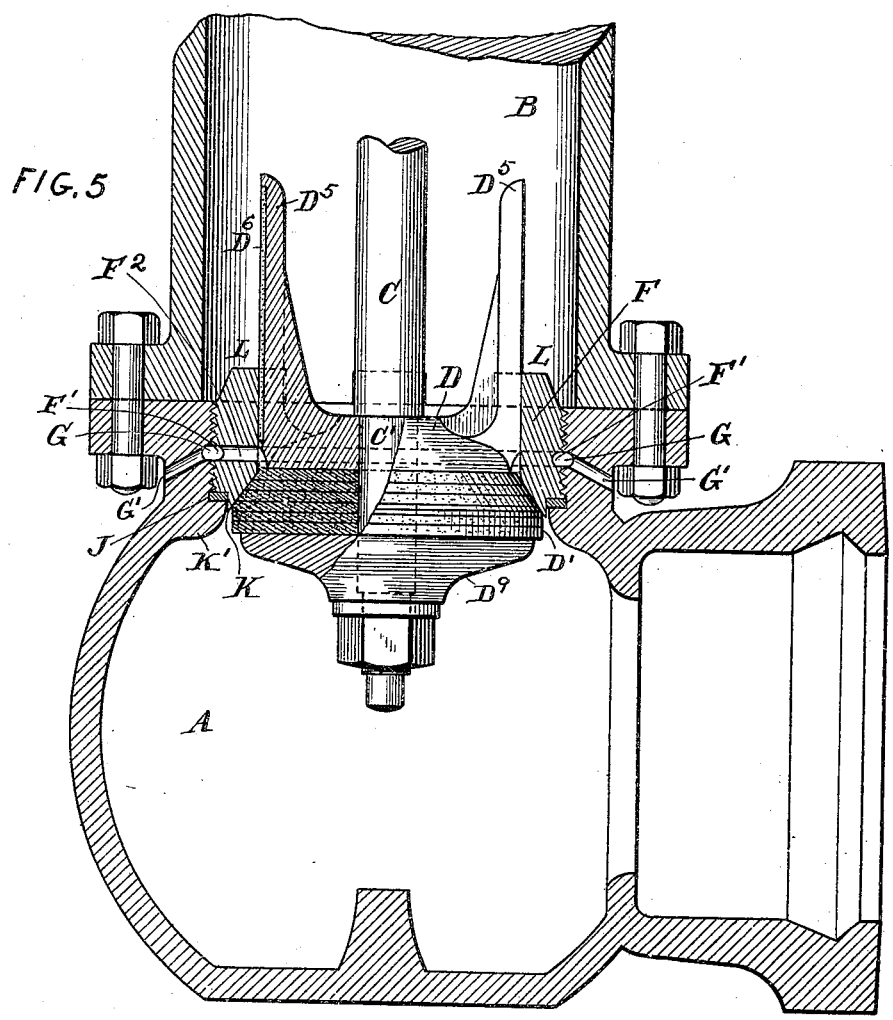
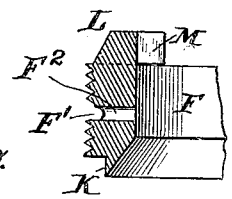

UNITED STATES PATENT OFFICE.

HERBERT M. LOFTON, OF CHATTANOOGA, TENNESSEE.

FIRE-HYDRANT.

978,385.  Specification of Letters Patent.  Patented Dec. 13, 1910.

Application filed August 30, 1909. Serial No. 515,147.

*To all whom it may concern:*

Be it known that I, HERBERT M. LOFTON, a citizen of the United States, and a resident of the city of Chattanooga, county of Hamilton, and State of Tennessee, have invented an Improvement in Fire-Hydrants, of which the following is a specification.

My invention has reference to fire hydrants and consists of certain improvements which are fully set forth in the following specification and shown in the accompanying drawings which form a part thereof.

The object of my invention is to provide a construction of valve mechanism which shall be capable of properly draining the hydrant and also adapted for work on high pressure mains.

My object is also to so construct the parts that the stock may be removed when necessary without disturbing the valve mechanism, and moreover, in which the valve mechanism may be removed without disturbing the elbow or shoe and stock of the hydrant whenever repairs are required; and furthermore to provide details of construction which shall be durable, effective and easily repaired.

My invention consists of certain improvements which are fully described hereinafter and defined in the claims, and these will be better understood by reference to the drawings, in which:

Figure 1 is a sectional elevation of a fire hydrant embodying my invention; Fig. 2 is a cross section of the same on line 2—2; Fig. 3 is a cross section of the same on line 3—3; Fig. 4 is a cross section of the same on line 4—4; Fig. 5 is a sectional elevation of a hydrant embodying my invention and having no auxiliary or pilot valve; and Fig. 6 is a section of a portion of the valve seat.

A is the shoe of the valve body and supports the stock B in any suitable manner. The shoe or elbow A has its upper part internally screw threaded and terminating at the bottom of the threaded portion in an inwardly directed flange K′ forming an annular shoulder or surface upon which a gasket J rests. The screw threaded portion is provided with an annular groove G from which a plurality of outwardly extending drain holes G′ open. Two such holes are shown, but there may be more than these, if so desired.

Screwed into the threaded portion of the shoe is the valve seat ring or bushing F having the valve seat at the bottom upon which the main valve seats itself, and at the top provided with a series of lugs L by which the bushing may be rotated while being screwed in place. This bushing or seat is screw-threaded upon the circumference so as to screw into the threaded portion of the shoe and this threaded part is also provided with an annular groove F′ which, when the bushing is screwed in place, comes opposite to groove G in shoe to form a complete annular drain passage.

By forming the annular passage GF′ between the seat ring F and the shoe, an excellent drainage communication is provided between the interior drainage ports and the exterior drainage ports. It will therefore be understood that, by employing this annular grooved structure, the drainage opening $F^2$ will always be insured communication with the outer drainage apertures G′ irrespective of the particular position which it might assume when the seat ring or bushing F has been screwed down tight upon the gasket J. Another important feature due to the annular grooves G and F′ is that the threads opposite these grooves on both the seat ring and the upper opening in the cast iron shoe, are cut away entirely, thus doing away with the liability of either of these threads corroding by the drainage water. This makes it easy to unscrew the seat ring, because if the annular groove F′ was turned out of the seat ring F and not out of the cast iron shoe also, the thread on the cast iron part would rust or corrode and thereby form an obstruction against the seat ring being freely unscrewed when required for repairs. On the other hand, if the groove G in the shoe was turned out and the groove F not provided in the seat ring, then there would be a deposit on the parts of the threads just opposite to groove G, which would make it difficult to unscrew the seat ring from the shoe. It will therefore be seen that the provision of this double groove provides not only greater area in waste water apertures but also prevents interference with free removal of the seat ring when required.

The lower part of the seat ring or bushing F is provided with an annular shoulder and a cylindrical wall which fits close to the flange K′ on the shoe, so as to form above the said flange an annular chamber in which the gasket J is located. When the bushing is screwed down tight upon the gasket, the latter makes a tight joint and the coöperation of the cylindrical wall K with the flange K' prevents the gasket working out of the annular chamber in which it is located.

C is the valve rod or stem and has secured to its lower end C', a pilot valve $E^4$ which seats upon a valve seat $E^8$ upon the bottom of the main valve D. The pilot valve has its upper body portion made cylindrical as indicated at E, which is flanged at the top as at $E^2$ and also provided with ports E' extending through the top and laterally through the wall at $E^3$ near the bottom. The cylindrical body E of the pilot valve snugly fits a tubular cylindrical portion $D^8$ of the main valve D, so that it may be raised and lowered within the main valve and form a good mechanical sliding connection with it. The flange portion $E^2$ of the body of the auxiliary or pilot valve slides in an enlarged diameter in the upper portion of the main valve body $D^8$ so that the pilot or auxiliary valve may be depressed until the flange portion $E^2$ strikes the shoulder $D^4$ on the main valve after which, any further depression of the auxiliary or pilot valve will lower the main valve with it.

During the operation just described, the pilot valve $E^4$ will have been lowered from its seat $E^8$ and the lateral ports $E^3$ will have been opened to the shoe below the valve seat $E^8$ thereby permitting the water in the shoe to pass freely upward through the ports E' into the stock of the hydrant above the main valve to relieve the pressure against opening the main valve. When the ports are in the position shown in Fig. 1, the ports $E^3$ are closed and the pilot valve $E^4$ is seated upon the seat $E^8$. By providing the lateral opening $E^3$ in the body E of the pilot or auxiliary valve, which are to relieve the higher pressure of the water upon the opening of the pilot valve, at a distance from the valve $E^4$ itself, it will be seen that when the valve is fully opened there will be no cutting of the valve or the valve seat for the reason that when the valve is fully opened the opening $E^3$ will be entirely removed from either the valve or the valve seat.

The main valve D has its lower cylindrical portion $D^8$ provided with the conical leather packing D' which is kept in place by the collar $D^9$, said collar being screwed upon the lower end of the cylindrical body portion $D^8$. The upper portion of the main valve body is provided with wings $D^5$ which work in grooves formed by the face of the lugs L, L, and the lateral projections M, M, which extend inwardly over the water passage at a higher elevation than the upper surface of the seat ring or bushing F, so that there is no interference with the free passage of the water through the bushing except so far as it may be obstructed by the main valve itself. I have shown four lugs L, but two only of these are grooved and provided with the projections M as will be understood by reference to Fig. 2. One of these wings $D^5$ has its face provided with a leather packing strip $D^6$ which works in contact with the face of the seat ring or bushing and grooved lug. The bushing is provided with a drain aperture $F^2$ which opens inwardly from the annular groove F' and in line with the packing strip $D^6$ of the wing $D^5$, as shown in Figs. 1 and 4. The body of the main valve D is also provided with a transverse drainage aperture $D^2$ which, when the main valve is closed, is in line with the drainage aperture $F^2$ in the seat ring or bushing. The pilot valve body E is also provided with a transverse drainage aperture $D^3$ which, when the pilot valve is closed, is in alinement with the drainage aperture $D^2$ in the main valve, as shown in Figs. 1 and 4. From the position of the ports as shown in Fig. 1, it will be seen that water in the stock of the hydrant may drain through one of the apertures E' and out by the passages $D^3$, $D^2$, $F^2$, F', G and G' to the outside of the hydrant and this drainage will take place by gravity.

If the valve is to be opened against a heavy water pressure the lowering of the valve stem C will lower the pilot valve $E^4$, while the main valve is held to its seat by the water pressure. While the auxiliary or pilot valve is being lowered, the drainage aperture $D^2$ in the main valve becomes closed and then the port $E^3$ becomes exposed below the seat $E^8$. The pressure below the main valve is then permitted to exert itself by forcing water upward through the ports E' into stock above the main valve. When the stock is full of water, it will have the same pressure as the pressure below the main valve. There will be at this time no open drainage apertures, so that this pressure cannot exert itself upon the ground outside of the hydrant to undermine it. A further downward movement of the valve stem will cause the flange $E^2$ of the pilot valve body to press upon the shoulder portion $D^4$ of the main valve and then depress the main valve to open the hydrant with full head of water. While the main valve is being lowered, the packing strip $D^6$ seals the drainage port $F^2$, thereby maintaining the hydrant against drainage.

When the hydrant is fully opened, there will be passage for the water through the main valve and through the auxiliary or pilot valve. When closing the hydrant, the first operation of the raising the valve stem is to permit the main valve D to move upwardly, until it is seated. A still further raising of the valve stem would cause the pilot valve E to move upward until it is seated upon the main valve. This would then bring the opening $D^3$ in the pilot valve into register with the opening $D^2$ in the main valve, and the main valve in turn would have its opening $D^2$ in register with the opening $F^2$ in the seat ring, and allow the water in the hydrant stock or barrel, to drain through the passages just mentioned, and through the grooves G and F', and by means of drainage passages G' in the hydrant shoe to the outside of the hydrant stock. Both valves will now be closed and the stock may drain through the ports E', $D^3$, $D^2$, $F^2$, F', G and G' under the action of gravity. As the valve stem C is raised and lowered by the rotation of the screw nut N at its upper end, there would be a tendency in the stem to turn, and to prevent this I provide the auxiliary valve body E with lugs $E^5$ which work in grooves in the body of the main valve D, as shown in Figs. 2 and 3. The body of the main valve D has the wings $D^5$ guided in the grooves on the lugs L, L, between the projections M M of the said lugs and is thus held against rotating, and consequently, the auxiliary valve body is also held against rotary movement.

Referring now to the upper part of the hydrant, the bonnet B' is bolted to the top of the stock and clamped between these parts in the diaphragm $B^3$. P is the stuffing box through which the flanged nut N extends, said nut having the flange O which seats upon the upper wall of the stuffing box. P' is the packing and Q is the follower ring which presses down upon the packing under the flange O of the adjusting nut portion. R is a hold down nut or bushing which is screwed in the top of the bonnet and presses down upon the flange O of the nut N. The lower end of the nut N may extend through stuffing box and be guided by the baffle or diaphragm $B^3$. It will be understood that when the hold down nut or bushing R is firmly seated, the annular flange O of stem nut fits neatly and also turns freely and without any material vertical play. By revolving this nut N with a suitable wrench, the valve may be raised or lowered through the stem C.

By providing the inwardly directed projections M, M, only above the level of the aperture or opening in the seat ring or bushing F, the opening in the seat ring or bushing may be turned in a lathe so as to become round or cylindrical and as the main valve D may have its wings $D^5$ turned in the same manner it will be evident that the parts may have a close fit; and as the working surface between the guide wings and the seat ring or bushing is smooth, they form an excellent guide means for keeping the main valve centralized during its opening and closing operation. The leather packing strip $D^6$ will provide for any excess of play and being of a yielding character, will insure the drainage aperture $F^2$ being properly sealed when the main valve is opened. The projections M M and the groove parts may be omitted and any other convenient means employed to guide the wings. The machine work of this entire valve mechanism may be largely done in the lathe, and consequently, is inexpensive and secures the working of several parts practically concentric.

While I have described my invention with respect to its use, not only upon ordinary water mains, but also upon high pressure mains where the pressure may range from 150 to 500 lbs. and in which case the auxiliary or pilot valve is important, it will not be necessary to employ the pilot valve where the pressure of the water main is sufficiently low. In such cases the main valve may be operated directly by the valve stem as clearly shown in Fig. 5.

Fig. 5 while showing the hydrant without the use of the auxiliary or pilot valve, does not differ in details of construction in other respects from the general structure shown in Figs 1 to 4. In Fig. 5 the hydrant is shown as adapted for ordinary use, and as it does not have the auxiliary valve through the main valve the diameter of the main valve need not be so large. In this case the valve stem C is directly connected with the valve D so that the valve is positively moved with every movement of the valve stem. The construction at the top of the valve stock for operating the valve stem would be the same as shown in Fig. 1, but need not have capacity for so great a vertical movement to the valve stem. The valve proper is provided with a top plate having wings $D^5$ guided in the lugs L, as in the case of Fig. 1; the seating part of the valve is of leather and these are clamped against the top plate by the collar $D^0$ at the bottom which in this case is held in position concentric with the part C' of the valve stem by the nut $C^2$. The drainage annular grooves and ports in the valve seat ring F and shoe A of the hydrant are the same in the case of Fig. 1, but in the valve itself the port for drainage is omitted and the drainage takes place from the stock through the space left under the guide wings $D^5$. In this case it is not necessary to provide any definite ports through the valve itself.

All of the advantages which have been described with respect to the construction of the shoe to the valve seat ring and main valve structure of Figs. 1 to 4 equally apply to the structure shown in Fig. 5, and it will not be necessary to elaborate further upon these advantages.

While I prefer the construction shown, the details thereof may be modified without departing from the spirit of the invention.

Having now described my invention what I claim as new and desire to secure by Letters Patent, is:—

1. In a fire hydrant, the combination of the shoe having the upper integral screw-threaded flange part formed with an annular groove formed in the screw threaded surface so that the threads are arranged both above and below the groove and also having a plurality of outwardly extending drain holes opening therefrom, a valve seat ring screwed into the shoe and having a drain opening in line with the annular groove of the shoe and also having inwardly projecting guide lugs above the line of the drain opening, a gasket between the bottom of the seat ring and shoe, and a valve for the seat ring provided with upwardly extending guide wings guided in the inwardly projecting guide lugs of the seat ring.

2. In a fire hydrant, the combination of the shoe having the screw-threaded flange part formed with an annular groove and a plurality of outwardly extending drain holes opening therefrom, a valve seat ring screwed into the shoe and having a drain opening in line with the annular groove of the shoe and also having inwardly projecting guide lugs above the line of the drain opening, a gasket between the bottom of the seat ring and shoe, a valve for the seat ring provided with upwardly extending guide wings guided in the inwardly projecting guide lugs of the seat ring, a valve rod, and a pilot valve secured to the valve rod and seating upon the lower part of the main valve and also having a cylindrical body secured to the valve rod and provided with apertures for providing a communication for the water below the main valve to the stock above the same when the pilot valve is open and a drain for the water in the stock to the drain orifice of the seat ring when the pilot is closed upon its seat.

3. In a fire hydrant, the shoe having a screw-threaded orifice at its top terminating in an inwardly directed flange and also having an annular groove formed in the screw threaded portion intermediate of its ends so that screw threads extend above and below the groove and provided with a discharge aperture opening therefrom, combined with a valve seat ring screwed into the shoe and having an annular shouldered portion at the bottom extending through the central aperture within the flange of the shoe to form an annular pocket below the annular groove and inclosed on all sides and also having a drainage aperture in communication with the annular groove in the shoe, a gasket of less mean diameter than the screw threaded portion of the seat ring arranged in and fully filling the said pocket, and a valve device adapted to coöperate with the valve seat on the seat ring and provided with upwardly extending guide wings for guiding the valve and for controlling the drainage aperture through the seat ring.

4. In a fire hydrant, the shoe having a screw-threaded orifice at its top terminating in an inwardly directed flange and also having an annular groove formed in the screw threaded portion intermediate of its ends so that screw threads extend above and below the grooves and provided with a discharge aperture opening therefrom, combined with a valve seat ring screwed into the shoe and having a tubular opening and an annular shouldered portion at the bottom coöperating with the flange of the shoe to form an annular pocket below the annular groove and inclosed on all sides also upwardly and inwardly directed guide lugs arranged above the tubular opening in the seat ring and having further a drainage aperture in communication with the annular groove in the shoe, a gasket arranged in and fully filling the said pocket, and a valve device adapted to coöperate with the valve seat on the seat ring and provided with integral upwardly extending guide wings for guiding the valve and for controlling the drainage aperture through the seat ring.

5. In a fire hydrant, the shoe having a screw-threaded orifice at its top terminating in an inwardly directed flange and also having an annular groove provided with a discharge aperture opening therefrom, combined with a valve seat ring screwed into the shoe and having an annular shouldered portion at the bottom coöperating with the flange of the shoe to form an annular pocket inclosed on all sides and the said seat ring also having a deep annular groove on its outer threaded portion to come into register with the groove in the shoe when the seat ring is screwed into position, and also provided with a drainage aperture which is also in communication with the annular groove in the shoe, a gasket arranged in the said pocket, and a valve device adapted to coöperate with the valve seat on the seat ring and provided with upwardly extending guide wings for guiding the valve and for controlling the drainage aperture through the seat ring.

6. In a fire hydrant, the combination of the stock and shoe portion, with a seat ring at their juncture having a drainage opening, a main valve which seats upon the seat ring and controls the drainage opening therein, and an auxiliary valve seating upon the main valve and also controlling the drainage opening, whereby said drainage opening is sealed when either the main valve or the auxiliary valve is lowered and is unsealed only when both valves are closed upon their seats.

7. In a fire hydrant, the combination of a valve seat, a main valve guided upon said seat so as to open and close but held against rotation and having a tubular passage through it terminating in a valve seat on the bottom, an auxiliary valve adapted to the valve seat on the main valve and provided with a cylindrical body part fitting the tubular passage and having by-passages opening above the main valve at the top and opening radially near the bottom immediately above the auxiliary valve, and a valve stem to move the auxiliary valve directly and indirectly move the main valve, whereby the pressure below the main valve may be relieved through the by-pass before the main valve is opened.

8. In a fire hydrant, the combination of a valve seat, a main valve guided upon said seat so as to open and close but held against rotation and having a tubular passage through it terminating in a valve seat on the bottom and having an annular enlargement at its top and provided with a radial recess, an auxiliary valve adapted to the valve seat on the main valve and provided with a cylindrical body part fitting the tubular passage and having by-passages opening above the main valve at the top and opening radially near the bottom immediately above the auxiliary valve and also having a flanged top and a radial lug therefrom adapted to the annular enlargement of the passage in the main valve and its radial recess, and a valve stem to move the auxiliary valve directly and indirectly move the main valve, whereby the pressure below the main valve may be relieved through the by-pass before the main valve is opened.

9. In a fire hydrant, a seat ring having a screw-threaded exterior, a valve seat on its bottom and a plurality of upwardly extending and separated lugs at the top two of which arranged diametrically opposite are provided with inwardly extending projections arranged above the normal upper surface of the seat ring, with a main valve adapted to seat upon the seat ring and having its upper part provided with upwardly extending guide wings guided between the inwardly directed projections and lugs for guiding the valve vertically and holding it against rotation, and means for raising and lowering the valve.

10. In a fire hydrant, the combination of a valve seat having a drainage outlet, a main valve also having a drainage outlet, and an auxiliary valve carried upon and seated on the main valve and provided with a drainage aperture communicating with the hydrant stock above the main valve and with the drainage aperture in the valve seat through the main valve.

11. In a fire hydrant, a bonnet for the top of the stock provided with a stuffing box having a shouldered upper part, combined with a screw-threaded valve stem, a screw-threaded sleeve nut for the valve stem having a flange resting upon the shouldered portion of the stuffing box and terminating at the top in a head for a key or wrench, a retaining bushing screwed into the top of the bonnet and above the flange of the tubular part, a follower ring arranged below the flange of the sleeve-nut part and within the stuffing box, and packing for the stuffing box whereby the valve stem adjusting portions may be readily removed for re-packing when required.

12. In a fire hydrant shoe, the combination of the hydrant having an integral flanged top provided with a screw-threaded opening and terminating in an annular shoulder and said screw-threaded opening formed with an annular groove intermediate of the top and bottom of said screw threads and provided with a plurality of drain holes leading therefrom to the outside of the hydrant shoe, with a valve seat ring screwed into the shoe and provided with an annular groove on its outer threaded portion and which when the seat ring is screwed into position comes opposite the annular groove in the shoe thereby forming a double grooved portion and said seat ring being provided with a conical seat on its bottom and with a drainage aperture extending through it and into communication with the annular groove about the same and a conical valve for the seat ring.

13. In a fire hydrant, a bonnet having a stuffing box at its top, a valve stem, a sleeve nut extending through the stuffing box and having an annular flange seated upon the bonnet at the top of the stuffing box so as to be held against downward movement while free to be rotated and also having a screw connection with the valve stem, packing in the stuffing box, a gland above the packing and held down upon the same by the annular flange of the sleeve nut, and means carried by the bonnet for guiding the sleeve nut and pressing down upon the collar thereof for holding it against upward movement in the bonnet, the construction being such that the water cannot reach the means carried by the bonnet without passing through the packing.

14. In a fire hydrant, a body portion terminating at its upper part in a stuffing box, a sleeve nut extending through the stuffing box and forming a joint therewith, and also provided with an annular flange seated upon the body structure above the stuffing box, a valve stem having a screw connection with the sleeve, and an annular retaining bushing screwed into the top of the body portion above the flange of the sleeve nut to hold it in position and having a diameter greater than the diameter of the flange of the sleeve nut.

15. In a fire hydrant, the combination of the shoe having the screw-threaded upper part formed with an annular groove in the central portion of the threaded part and a plurality of outwardly extending drain holes opening therefrom, a valve seat ring screwed in to the shoe and having inwardly projecting guide lugs above the top plane of the circular opening of same and also having an annular groove formed in its outer threaded portion and a drain opening leading from the said groove to the inner side of the seat ring the said opening being located directly under and on a longitudinal line with the center of one of the inwardly projecting guide lugs, a main valve for the seat ring provided with upwardly extending guide wings guided in the inwardly projecting guide lugs of the seat ring and one of the said guide wings having suitable packing strip attached to its outer surface and arranged so that it will work in the inwardly projecting guide lug having the drain opening whereby when the main valve is closed the drain opening in the seat ring will be open.

16. In a fire hydrant, the combination of a shoe having a removable seat ring provided with an annular groove in its outer threaded portion and also having inwardly projecting guide lugs above the line of the top plane of the circular opening of same and also having a drain opening leading from the annular groove to the inner cylindrical opening of the seat ring said drain opening being located in a line directly below one of the inwardly projecting guide lugs, a main valve having upwardly projecting guide wings one of which is provided with a packing strip and arranged to work in between the inwardly projecting guide lug having the drain opening whereby when the main valve is being opened the packing strip will close the drain opening and when the main valve is closed the packing strip will be moved upwardly to uncover the drain opening and allow the water in the barrel of the hydrant to be drained out.

17. The combination of the shoe having a screw-threaded upper opening and provided with an annular groove removing the middle portion of the screw threaded part and said groove having a drainage aperture to the outside of the shoe, with a valve seat ring screw threaded upon its outer surface to engage the screw threads of the shoe and also having the middle portion of the screw threaded surface removed to form a groove bounded above and below by screw threaded portions and which coöperates with the groove in the shoe to form an annular chamber of large sectional area part in the shoe and part in the seat ring, and said seat ring being further provided with a drainage aperture opening through the same into the annular groove, and a valve seating upon seat ring and provided with means to control the drainage aperture.

18. A seat ring for a hydrant formed of an annular casting having a screw threaded outer periphery provided with an annular groove bounded above and below by screw threaded portions and also provided at the bottom with a valve seat and at the top with inwardly directed guide lugs and intermediate of said seat and guide lugs with a drainage aperture extending through the wall of the annular casting into the annular grooved portion thereof and an opening through the interior wall in vertical alinement with one of the inwardly directed guide lugs.

19. In a hydrant and valve consisting of a conical seating portion combined with a top plate provided with oppositely arranged upwardly extending guide wings reaching down to the seating portion, and a packing surface secured to the outer face of one of the wings, combined with a seat ring having a conical seat on its bottom part and vertical guide grooves for the guide wings and through which seat ring is a drainage aperture in the line of travel of the guide wing having the packing surface.

In testimony of which invention, I hereunto set my hand.

HERBERT M. LOFTON.

Witnesses:
J. L. MORRISON,
J. S. H. UMBACH.